UNITED STATES PATENT OFFICE.

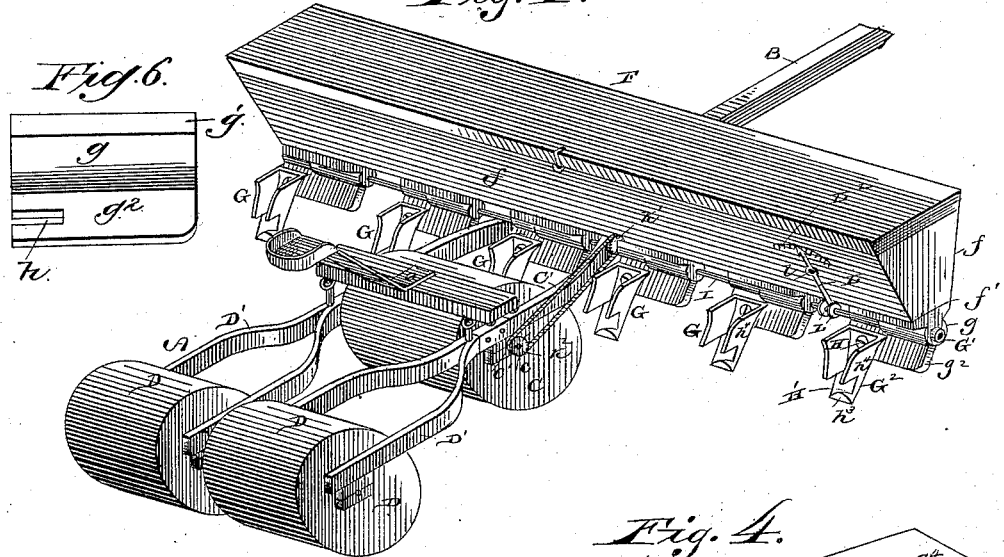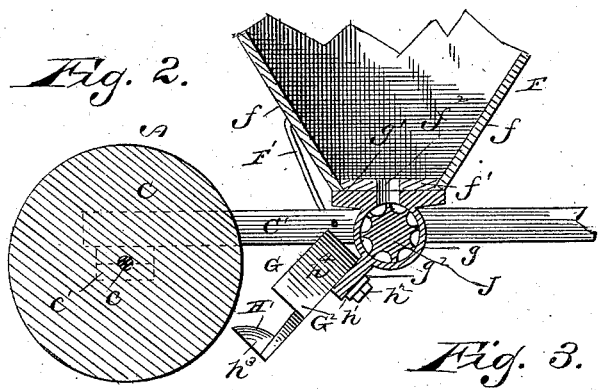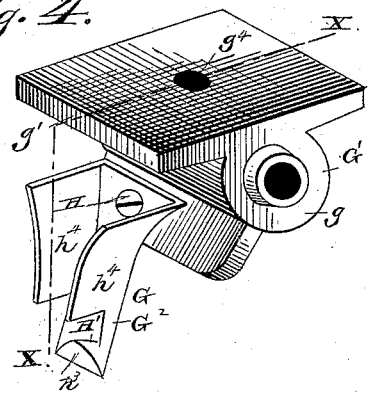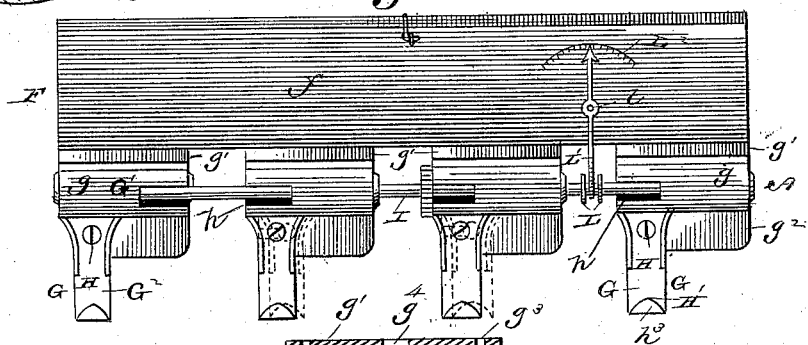

JOHN HOREY AND CANFIELD MARSH, OF ROSENDALE, WISCONSIN.

SEEDING-MACHINE.

SPECIFICATION forming part of Letters Patent No. 335,928, dated February 9, 1886.

Application filed September 1, 1885. Serial No. 175,899. (No model.)

*To all whom it may concern:*

Be it known that we, JOHN HOREY and CANFIELD MARSH, citizens of the United States, residing at Rosendale, in the county of Fond du Lac and State of Wisconsin, have invented new and useful Improvements in Seeding-Machines, of which the following is a specification, reference being had to the accompanying drawings.

Our invention has relation to improvements in seeding-machines of the class known as "force-feed;" and the novelty consists in the peculiar construction of the seed-cup, and in the several combinations, arrangement, and adaptation of the parts, substantially as hereinafter fully set forth, and particularly pointed out in the claims.

It is the especial object of our invention to combine a machine of the class above described with a land-roller, to provide a machine which shall possess simplicity, strength, and durability of construction, which shall be thoroughly effective in operation, and capable of being easily and quickly detached from the roller-frame and its driving mechanism.

We have shown an embodiment of our invention in the accompanying drawings, in which Figure 1 is a perspective view of our improved machine in position upon a land-roller. Fig. 2 is a transverse section through the hopper and front roller of the land-roller. Fig. 3 is a rear elevation of the hopper. Fig. 4 is a detail view of one of the series of feed-cups, and Fig. 5 is a sectional view thereof on the line $x\ x$ of Fig. 4. Fig. 6 is a detail view of one section of the seed-cup.

Like letters of reference denote corresponding parts in the several figures of the drawings, referring to which—

A designates a land-roller, and F the seed-hopper mounted on said land-roller frame, and detachably connected thereto, and B designates the draft-pole. The hopper can be mounted on the frame of a land-roller of any suitable construction, and in the accompanying drawings we have shown the hopper mounted on our preferred form of land-roller, which comprises a front roller, C, mounted on a shaft, $c$, which is journaled in proper bearings or boxes, $c'$, the said boxes being suitably secured to the roller-frame C'.

The draft-pole B of the machine is connected to the frame C' in any suitable manner, and the rear rollers, D, are preferably arranged out of alignment with the front roller and journaled in frames D', connected to the frame C' in any suitable or preferable manner.

F designates the hopper, rectangular in form, as shown, and having inclined sides $f$, connected or secured to a narrowed bottom, $f'$, having a series of openings, $f^2$, formed therein and at suitable intervals apart from each other, as is obvious.

G designates a feed-cup, which will be more fully described presently, secured to the bottom of the hopper, on the under surface thereof, by bolts or other suitable means, and adjacent the openings $f^2$ therein, and arranged in a series, the number of feed-cups and openings $f^2$ being equal.

I designates the shaft, on which is mounted, secured, or cast the revolving feed-wheels J, arranged within the feed-cups G, and adapted to discharge or force out the seed from the cups which falls therein through the openings $f^2$ from the hopper. The hopper is arranged transversely across the frame of the roller C and in front thereof, and is secured thereto by means of bolts passing through the bottom of said hopper and into the frame, and into the front end of the frame C', and by means of straps or castings F', also secured to the exterior face of the hopper and to the land-roller frame, as is obvious.

We have shown one means for practically mounting and securing the hopper detachably upon a land-roller frame; but we would have it understood that we do not limit ourselves to the construction and arrangement shown and described, as other devices can be substituted therefor, with perhaps a better result and without departing from the spirit of our invention. The shaft I, carrying the feed-wheels, is arranged longitudinally of the hopper, beneath the same, and is supported in apertures or bearings formed in the side walls of the feed-cups G. The shaft is rotated by motion transmitted from the shaft of the front roller, C, by a sprocket-chain, K, passing over sprocket-wheels K' K², the latter of which is cast with or formed or secured on the shaft of the roller C, while the former, K', is keyed or otherwise rigidly secured on the shaft I, and is of smaller diameter than the sprocket-wheel K², to rapidly revolve the shaft I. The shaft I is provided near or at one end with two collars, L, arranged a short distance apart from each other. Between the collars is fitted the lower bifurcated end of an indicating-arm, L', which is pivoted on the hopper, as at $l$, and adapted to indicate on a scale, L², the amount of seed sown, as is usual.

We will now proceed to describe our peculiar construction of feed-cup G. It consists of two parts, G' G², each of which constitutes a single casting, and are detachably bolted together and to the bottom of the hopper. The feed-cup G' proper consists of a cylindrical shell or case, $g$, having a head or one end wall perforated for the passage of the shaft I, which bears therein, said case $g$ forming a chamber, in which the seed from the hopper falls, and in which the corrugated feed-wheel J is located and adapted to revolve to force out the seed. The case $g$ has cast therewith flanges $g'$ $g^2$, the former of which is arranged on its upper surface and in a horizontal plane, and perforated, as at $g^3$, for the passage of securing-bolts to connect it to the hopper, and also having an opening, $g^4$, which is adapted to register with one of the series of openings $f^2$, and communicates with the chamber of the case $g$, to permit the seed to pass freely from the hopper into said chamber, while the latter flange, $g^2$, is arranged on the lower surface of the case $g$ and at an angle thereto, as shown. The case $g$ is provided with a longitudinal slot, $h$, at the open end thereof, and extending partly its length, for the escape of seed from the chamber into the delivery-spout G². The flange $g^2$ is provided with a recessed portion, $g^5$, at one end thereof, immediately beneath the slot of the case $g$, and through the slot in the flange passes a fastening-bolt, H, the head of which bears in the seed passage or channel of the delivery-spout G², while the lower threaded end thereof carries a washer and fastening-nut, $h'$ $h^2$. The delivery-spout G² is thus held at an angle to the case $g$, and in rear thereof, and in alignment with the flange $g^2$.

The delivery-spout G² comprises a base-plate, $h^3$, reduced at its smaller end, as shown, and two projecting ribs, $h^4$, arranged at each edge thereof in the same plane therewith, and at a distance from each other to provide a recess or channel for the passage of the seed from the chamber $g$. At the lower contracted end of the base-plate we provide a deflecting-shoulder, H', adapted to sow the descending seed broadcast, said shoulder having inclined faces and an apex, the faces diverging downwardly and outwardly therefrom until they reach the plane of the lower outer edge thereof. By this peculiar construction and arrangement of parts the relative positions of the receiving-case and delivery-spout can be changed and varied, and the seed is discharged from the receiving-chamber of the cup in the proper quantities and at the proper rate, and thoroughly and effectively distributed by the delivery-spout. By means of the slot $g^5$ in the flange $g^2$ of the receiving-casing G', the perforated upper end of the delivery-spout G², and the bolt passing through the slot and aperture of the casing-flange and spout, the latter can be adjusted laterally so as to direct and sow the seed to any desired place.

The device is extremely simple in construction, and possesses the requisite degree of strength and durability.

The receiving-case and delivery-spout can be quickly and readily disconnected from the hopper and from each other, for the purpose of repairs or to replace them by new cups when desired.

The feed-wheel J is corrugated or provided with a series of teeth, as shown herein; but we lay no claim thereto, as any construction thereof may be used with equal advantages.

The operation is as follows: The machine is set in motion, and power from the roller C is communicated to the shaft I and feed-wheels J by means of the sprocket wheels and chain, thus revolving the shaft and feed-wheels, and forcing the seed from the chambers of the cases $g$ through the slot $h$ therein into the channel of the delivery-spout G², from whence it passes and is scattered broadcast by the deflecting-shoulder H'.

The machine is especially adapted for sowing small seed—such as grass-seed and flax-seed—and land-plaster, in connection with the rolling and pressing devices C D.

Various modifications in the form and proportion of parts and details of construction may be made without departing from the principle or sacrificing the advantages of our invention, the essential features of which will be readily understood from the foregoing description, taken in connection with the drawings.

In order to define the nature and scope of our invention, we would state that we are aware that it has heretofore been proposed to provide a feed-cup for seeding-machines having a receiving-case and a discharge-spout, and hence we disclaim this broad feature; but in our improved machine we detachably and adjustably connect the delivery and scattering spout to the seed-receiving cases by a bolt and nut, whereby the discharge-spout can be regulated and adjusted without affecting the receiving-case or the feed-wheel and its shaft, so as to sow and distribute the seed of any particular point, and when a series of such discharge-spouts are employed they can be adjusted toward and from each other without affecting the seed-wheels and their shaft. The discharge-spouts are capable of ready detachment from the receiving-case, and the said case can also be removed from the hopper, when desired, as for repairs when broken or injured.

Having thus fully described our invention, what we claim as new, and desire to secure by Letters Patent, is—

1. In a seeding-machine, the combination of a frame, a roller, C', having a sprocket-wheel, a hopper secured directly to the frame and removable therefrom, a series of sectional feed-cups suspended from the hopper, and each provided with a bearing in its head $g$, a rotating shaft journaled in the bearings of the feed-cups, and having feed-wheels located therein, each of the feed-cups having a downwardly-inclined delivery-spout laterally adjustable thereon independent of the feed-wheel shaft, and a sprocket-chain adapted to transmit motion from the roller C′ to the rotating shaft, substantially as described.

2. A seed-cup comprising a slotted casing having an inclined slotted flange, a downwardly-projecting delivery-spout, and a bolt and nut for detachably and adjustably securing the delivery-spout to the slotted flange of the casing, substantially as described.

3. A sectional feed-cup, each section of which is cast in one piece, comprising a slotted casing, G′, having a head, $g$, and an inclined slotted flange, $g^2$, an inclined delivery-spout, $G^2$, having converging side walls and a scattering-shoulder, $h^3$, and a bolt and nut for detachably and adjustably connecting the delivery-spout to the flange $g^2$ of the casing, substantially as described.

4. The combination of a hopper, a series of sectional feed-cups suspended therefrom, and a rotating shaft journaled in said cups and having feed-wheels located therein, each of said feed-cups comprising a casing, a downwardly-inclined delivery-spout, and a bolt and nut for detachably and adjustably connecting the casing and spout together, substantially as described.

In testimony that we claim the foregoing as our own we have hereto affixed our signatures in presence of two witnesses.

JOHN HOREY.
CANFIELD MARSH.

Witnesses:
FRANK BOWE,
C. H. ANDERSON.